US012001653B1

(12) United States Patent
Graham et al.

(10) Patent No.: US 12,001,653 B1
(45) Date of Patent: Jun. 4, 2024

(54) INTEGRATED BACKEND AND DYNAMIC INTERFACE SYSTEM FOR HANDLING MULTIPLE TRANSACTION CHANNELS ACROSS DIFFERENT DEVICES

(71) Applicant: STARBUCKS CORPORATION, Seattle, WA (US)

(72) Inventors: Jeremy S. Graham, Snoqualmie, WA (US); Felicia I. Bacon, College Station, TX (US); Mehdi M. Benabdalah, Renton, WA (US); Lyndsay Jayne Buban, North Bend, WA (US); Jeremy M. Cabrido, Seattle, WA (US); Daniel Cerda, Bothell, WA (US); Owen A. Flannigan, Bothell, WA (US); Dana Gould, Syracuse, NY (US); Sharone Gorla, Stoneham, MA (US); David Arthur Hull, Seattle, WA (US); Ashok Jayavijayan, Bellevue, WA (US); Aditya Jhamb, Seattle, WA (US); Ram P. Kaligatla, Seattle, WA (US); Hyungku Sean Kim, Bellevue, WA (US); Santoshsubha Krishnan, Redmond, WA (US); Morayo S. Labisi, Indio, CA (US); Richard P. Lichkus, Charlestown, MA (US); Jesus E. Mendoza, Seattle, WA (US); Chadwick C. Meyer, Seattle, WA (US); Katherine E. Reinhart, Seattle, WA (US); Stephanie Victoria Vasquez-Soltero, Mountlake Terrace, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/201,804

(22) Filed: May 25, 2023

(51) Int. Cl.
  *G06F 3/0482* (2013.01)
  *G06Q 20/10* (2012.01)
  *G06Q 20/32* (2012.01)

(52) U.S. Cl.
  CPC ........ *G06F 3/0482* (2013.01); *G06Q 20/102* (2013.01); *G06Q 20/3276* (2013.01)

(58) Field of Classification Search
  CPC . G06F 3/0482; G06Q 20/102; G06Q 20/3276
  See application file for complete search history.

(56) References Cited

U.S. PATENT DOCUMENTS

| 11,302,291 | B1 * | 4/2022 | McNally | ............... G06F 3/1423 |
| 2010/0161432 | A1 * | 6/2010 | Kumanov | ............ G06Q 20/102 705/40 |

(Continued)

FOREIGN PATENT DOCUMENTS

WO     WO-2017210245 A1 * 12/2017 ........... G06F 3/0482

*Primary Examiner* — Daniel W Parcher
(74) *Attorney, Agent, or Firm* — Kilpatrick Townsend & Stockton LLP

(57) ABSTRACT

An integrated backend and dynamic interface system can be provided for handling multiple transaction channels. In one example, a client device can receive a unique identification code corresponding to a guest at a physical location associated with an entity. The client device can forward the unique identification code to a backend system configured to analyze a history of the guest to determine a customized object previously obtained by the guest from the entity. The client device can receive information from the backend system about the customized object and configure a graphical user interface to indicate the customized object. The graphical user interface can also include a graphical option that is selectable by a user for adding the customized object to an object order for the guest.

21 Claims, 6 Drawing Sheets

(56) References Cited

U.S. PATENT DOCUMENTS

| | | | | |
|---|---|---|---|---|
| 2013/0311913 A1* | 11/2013 | McCoy | .................... | G06F 9/451 |
| | | | | 715/762 |
| 2013/0339163 A1* | 12/2013 | Dumontet | .......... | G06Q 30/0631 |
| | | | | 705/15 |
| 2014/0310651 A1* | 10/2014 | Padgett | ................. | G06F 3/0482 |
| | | | | 715/810 |
| 2015/0073925 A1* | 3/2015 | Renfroe | ............. | G06Q 30/0641 |
| | | | | 705/15 |
| 2015/0082243 A1* | 3/2015 | Taylor | ................... | G06F 3/0482 |
| | | | | 715/814 |
| 2015/0161417 A1* | 6/2015 | Kaplan | ................ | G06K 7/1417 |
| | | | | 235/380 |
| 2016/0171584 A1* | 6/2016 | Cao | ...................... | G06Q 20/102 |
| | | | | 705/26.62 |
| 2016/0360336 A1* | 12/2016 | Gross | ................... | H04W 4/025 |
| 2017/0039599 A1* | 2/2017 | Tunnell | .............. | G06Q 30/0241 |
| 2017/0109843 A1* | 4/2017 | Berg | ....................... | G06Q 50/12 |
| 2018/0096440 A1* | 4/2018 | Lopez | ................ | G06Q 30/0259 |
| 2021/0365511 A1* | 11/2021 | Matloub | ............ | G06F 16/9538 |

* cited by examiner

INTEGRATED BACKEND AND DYNAMIC INTERFACE SYSTEM FOR HANDLING MULTIPLE TRANSACTION CHANNELS ACROSS DIFFERENT DEVICES

TECHNICAL FIELD

The present disclosure relates generally to backend systems for handling transaction channels. More specifically, but not by way of limitation, this disclosure relates to an integrated backend and dynamic interface system for handling multiple transaction channels.

BACKGROUND

With the advent of computer networks and the Internet, there have been multiple transaction channels developed through which individuals can engage in transactions. For example, individuals can execute a mobile application on their user devices (e.g., smartphones or tablets) to quickly and easily place orders with an entity over the Internet. In-store kiosks have also been developed to help facilitate orders submitted on-premises. These kiosks are installed onsite and, through a network connection, allow guests to place orders themselves. Register terminals (e.g., POS terminals) are also commonly used on-premises and, through a network connection, allow users to take orders of guests. Each of these different channels for placing an order can be considered a different transaction channel, which is also referred to herein as a "channel" for short. These and other transaction channels can provide different modalities for submitting orders over a network connection that did not exist pre-Internet. And, each of these channels may have different backend systems and frontend interfaces that are specifically tailored to their corresponding functionality.

SUMMARY

One example of the present disclosure includes a method. The method can involve receiving, by a client device operated by a user at a physical location associated with an entity, a unique identification code corresponding to a guest at the physical location, the user being different from the guest. The method can involve receiving forwarding, by the client device, the unique identification code to a backend server system that is remote from the physical location, the backend server system being configured to analyze a history of the guest to determine a customized object previously obtained by the guest from the entity. The method can involve receiving, by the client device, information from the backend server system about the customized object previously obtained by the guest from the entity. The method can involve receiving configuring, by the client device, a graphical user interface to indicate the customized object, wherein the graphical user interface includes a graphical option that is selectable by the user for adding the customized object to an object order for the guest.

Another example of the present disclosure includes a non-transitory computer-readable medium comprising program code that is executable by one or more processors of a client device of a user for causing the client device to perform operations. The operations can include receiving a unique identification code corresponding to a guest at a physical location associated with an entity, the user being different from the guest. The operations can include forwarding the unique identification code to a backend server system that is remote from the physical location, the backend server system being configured to analyze a history of the guest to determine a customized object previously obtained by the guest from the entity. The operations can include receiving information from the backend server system about the customized object previously obtained by the guest from the entity. The operations can include configuring a graphical user interface to indicate the customized object, wherein the graphical user interface includes a graphical option that is selectable by the user for adding the customized object to an object order for the guest.

Yet another example of the present disclosure can include a system comprising one or more processors and one or more memories. The one or more memories can include instructions that are executable by the one or more processors for causing the one or more processors to perform operations. The operations can include receiving a unique identification code corresponding to a guest at a physical location associated with an entity. The operations can include providing the unique identification code to a backend server system that is remote from the physical location, the backend server system being configured to analyze a history of the guest to determine a customized object previously obtained by the guest from the entity. The operations can include receiving information about the customized object previously obtained by the guest from the entity. The operations can include configuring a graphical user interface to indicate the customized object, wherein the graphical user interface includes a graphical option that is selectable by a user for adding the customized object to an object order for the guest.

DETAILED DESCRIPTION

Figure 1:
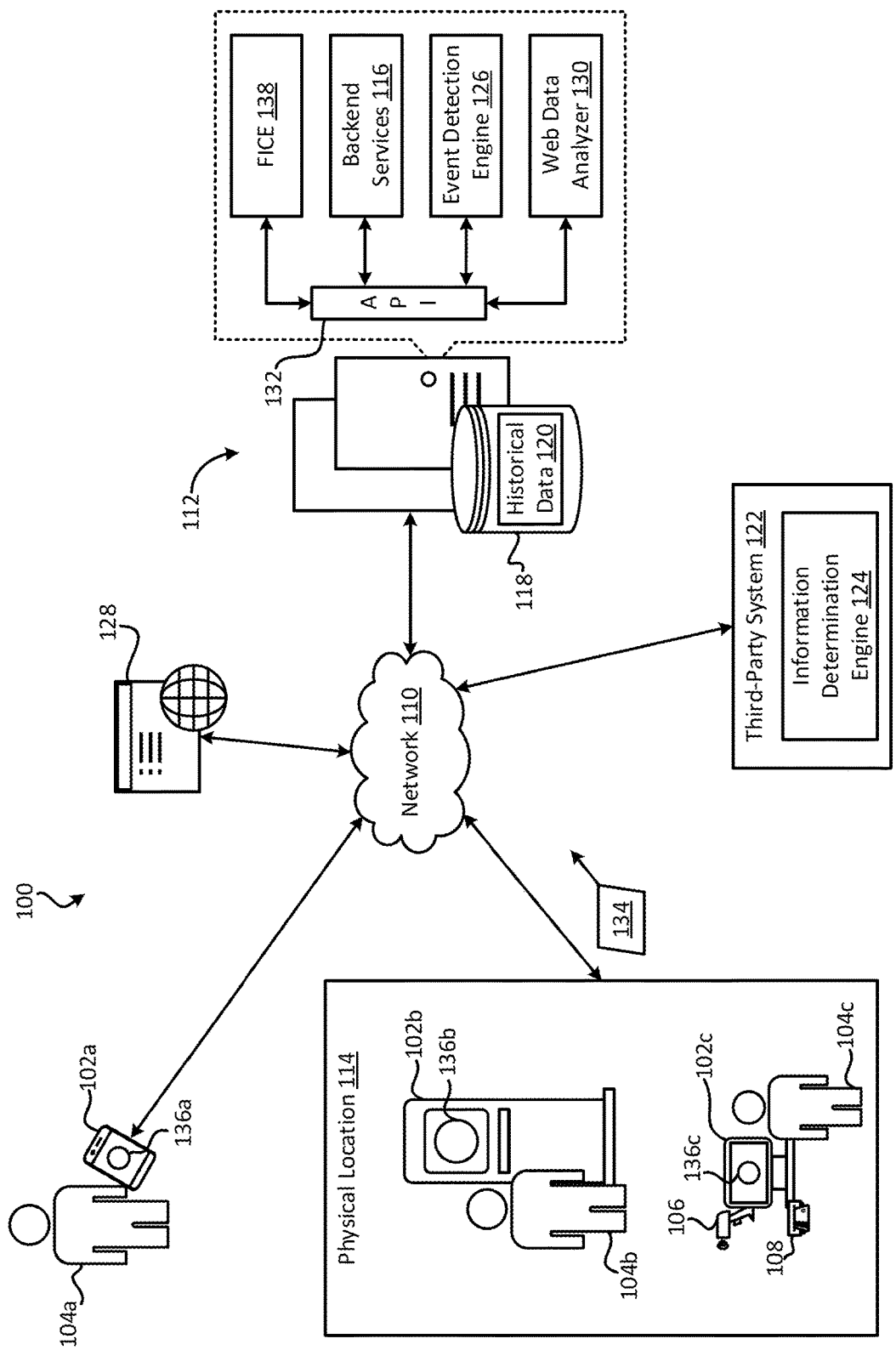
FIG. 1 shows a block diagram of an example of a system according to some aspects of the present disclosure.

With the advent of computer networks and the Internet, multiple transaction channels (e.g., modalities) have been developed through which individuals can place orders for products from an entity. An entity that wants to leverage multiple channels will normally have different backend systems and frontend interfaces for these different channels. The frontend interfaces are the graphical user interfaces on the frontend devices that facilitate the process of placing an order. The main reason for having different backend systems and frontend interfaces for these different channels is to allow for a greater customization, so that they can be tailored to the functionality and frontend devices provided for each channel.

While having independent backend systems and frontend interfaces for each channel has some advantages, it also has numerous disadvantages. For example, this backend arrangement can be expensive and consume a significant amount of computing resources, such as processing power, memory, storage, bandwidth, and electricity. For instance, there it is common for identical content to be saved in multiple storage locations to support the independent backend systems, which is an inefficient utilization of limited storage space. Likewise, numerous instances of the same or similar services (e.g., microservices or serverless functions) may be executed concurrently to support the independent backend systems, which is an inefficient use of limited processing power and memory. Significant amounts of bandwidth may also be consumed in handling all of the different network traffic and routing for the independent backend systems. Beyond consuming large amounts of computing resources, this backend arrangement can slow deployment times for updates, because each independent backend system must be separately updated for all channels. This is a manual and time consuming process that is more likely to produce errors, for example if an update is incompatible with one of the backend systems or is improperly applied.

Similar problems exist on the frontend. Normally, the frontend interfaces are substantially fixed and hardcoded into the frontend applications installed on the frontend devices. But this increases the size and complexity of the frontend applications, which in turn consumes more storage space and processing power on the frontend devices. This approach also makes it slower, more challenging, and more time consuming to update the frontend interfaces.

Some examples of the present disclosure can overcome one or more of the abovementioned problems by providing an integrated backend and dynamic interface system for handling multiple different transaction channels. The integrated backend is a centralized system capable of handling transactions through multiple, distinct channels such as mobile applications, kiosks, register terminals, and others. In the integrated backend, various types of services and databases are deployed and integrated using application programming interfaces (APIs) to facilitate the functionality of the various channels. The integrated backend can also be used in conjunction with frontend software to dynamically generate the user interfaces for each of the channels, so that the user interface content is coordinated and appropriate for each of the channels and frontend devices. By using the same backend services, databases, and APIs to perform similar functions for each channel, and by dynamically generating the frontend user interfaces for each channel, significant savings can be achieved in terms of resource consumption. These techniques also reduce the amount of time and difficulty required to deploy updates, since the updates only need to be made to the integrated backend to be effective across all channels and frontend interfaces.

In some examples, the frontend interfaces may be dynamically customized based on the guest being served. For example, a client device may serve as a frontend device for a transaction channel. The client device may be, for example, a tablet or other mobile device with a frontend interface for use by a user in taking orders of guests. While taking a guest's order, the user can operate a scanning device to scan a physical identification of the guest. Examples of the scanning device can include a laser scanner or a camera. In some examples, the physical identification may be a membership card, reward card, or another type of physical card with the unique identification code. In other examples, the physical identification may be a mobile device (e.g., a smartphone or a smart watch) with the unique identification code output on its display. The unique identification code can be in a human-readable format or in a machine-readable format, such as a barcode or QR code. After the scanning device scans the physical identification, the scanning device can transmit the unique identification code to the client device. In some cases (e.g., if the scanning device is broken), the user can manually input the unique identification code associated with the guest. Either way, the client device can receive the unique identification code and forward the unique identification code to the integrated backend system, which can determine one or more frontend-interface customizations based on the unique identification code.

For example, the integrated backend can analyze the guest's history to determine that the guest previously obtained a specific item customized in a particular way. Based on this determination, the integrated backend system can transmit a frontend customization to the client device, which can respond by dynamically updating the frontend interface to include the frontend customization. For example, the client device can adjust the frontend interface to display the specific item, customized in the particular way, as an interface option. Prior to the frontend customization, the frontend interface may not have had this interface option. If the guest wants the same item customized in the same way, the user can quickly and easily add that item to the guest's order by selecting the interface option. Thus, by dynamically customizing the frontend interface to the guest being served, order entry can be significantly expedited and order errors can be reduced.

As mentioned above, at least some of the frontend-interface generation can be offloaded to the integrated backend system. This can increase the flexibility of the frontend interface, so that it is dynamically customizable per channel, per store, per guest, per device-type, etc. In addition to increasing the flexibility of the frontend interface, this offloading can also result in fewer computing resources (e.g., processing power and memory) being consumed and required by the frontend devices, which can open the door to a wider variety of frontend devices than was previously possible. For example, thin client devices and other low-resource devices may be used as frontend devices.

Some examples may also provide for enhanced, accessible frontend interfaces usable by those who are visually impaired. For instance, a screen reader can be incorporated into the frontend software to enable the contents of a given interface screen to be read aloud as synthetic speech to a user. The visual characteristics of the frontend interface may also be selectively customizable for accessibility. For example, an accessibility mode may be engaged that uses a color scheme designed to make the frontend interface easier to read for those who are visually impaired. These accessibility features can allow more users (e.g., workers) to easily operate the frontend interfaces.

These illustrative examples discuss the general subject matter provided here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 according to some aspects of the present disclosure. The system 100 includes multiple client devices 102a-c. The first client device 102a can be any suitable type of user device, such as a mobile phone, a tablet, a laptop computer, a desktop computer, or a wearable device such as a smart watch. The second client device 102b is a kiosk installed at a physical location 114, such as a store. The third client device 102c is a register terminal that may also be installed at the physical location 114. Other examples may involve a different number and combination of client devices. The client devices 102a-c are connected via one or more networks 110 to a backend system 112 configured to facilitate transactions with an entity, such as a company. Examples of the networks 110 can include private network, such as a local area network, or a public network, such as the Internet. The entity may own, operate, or otherwise be associated with the physical location 114, its client devices 102b-c, and/or the backend system 112.

As shown in FIG. 1, a first user 104a can operate the first client device 102a to place their own order with the entity over the Internet. The first user 104a can be remote from the physical location 114 when they place their order. A second user 104b may operate the second client device 102b to place their own order with the entity. The second user 104b may be onsite at the physical location 114 when they place their order. And a third user 104c may operate the third client device 102c to place an order with the entity on behalf of a guest (e.g., user 104b) at the physical location 114. Both the third user 104c and the guest may be onsite at the physical location 114 when the order is placed. Each of these different modalities for placing an order can be considered a different transaction channel. Some or all of the client devices 102a-c may have different frontend interfaces 136a-c from one another based on their corresponding transaction channels. The different frontend interfaces 136a-c may have different functionality from one another, though their actual content may be drawn from the same databases 118 for consistency and simplicity. This may make it faster and easier to update the content and functionality of the frontend interfaces 136a-c than using conventional approaches.

Although conventionally each of the above transaction channels is supported by a separate backend system, in some examples of the present disclosure some or all of these channels can be supported by the same backend system 112. More specifically, the backend system 112 can include any number of backend services 116 deployed on any number of physical servers, which are interconnected with one another via one or more networks. Examples of the backend services 116 can include microservices and serverless functions, such as Lambda functions. The backend services 116 can be deployed in containers or virtual machines and scaled accordingly, depending on the load or other factors. Different backend services 116 can be configured to perform different functions, as will be described in greater detail later on with respect to FIG. 2. The backend services 116 can cooperate to perform any of the functionality required to implement the different transaction channels. In some examples, the same backend services 116 can be configured to perform the same functionality, regardless of the channel. For example, the same cart service can be used to populate an order for multiple different channels. As another example, the same menu service can be used to generate a menu in multiple frontend interfaces 136a-c for multiple different channels. Using the same backend services 116 to support multiple different channels can reduce the consumption of computing resources, reduce latency and errors, simplify updating procedures, improve consistency across channels and user experiences, and provide other benefits.

To facilitate communication between the client devices 102a-c and the backend system 112, the backend system 112 can include one or more application programming interfaces (APIs). The APIs 132 can provide a communication mechanism through which the client devices 102a-c can submit requests to the backend system 112 and the backend system 112 can provide responses to the client devices 102a-c. In some examples, the same API 132 can be used for multiple (e.g., all three) channels, so that the requests and responses are formatted similarly for the multiple channels. This can create a simple, plug-and-play type interface through which the system 100 is extendable to add additional transaction channels and devices within transaction channels. As long as the frontend software on the client device is programmed to interface with the API 132, any number of additional devices and channels can be easily added to the system 100.

As mentioned earlier, the client devices 102a-c may have different frontend interfaces 136a-c corresponding to their respective transaction channels. Some of the frontend interfaces 136a-c may have options that the others do not. For example, a first frontend interface 136a on the first client device 102a may have an option for updating the user's 104a personal account. That option may be absent from a third frontend interface 136c of the third client device 102c. And the third frontend interface 136c may have an option for alerting a manager or other party of a problem. That option may be absent from the first frontend interface 136a. Additionally, some transaction channels may have functionality that others may not. For example, a third transaction channel associated with the third frontend interface 136c may have more flexibility in customizing orders than a first transaction channel associated with the first frontend interface 136a, for example to give workers a greater ability to customize orders than guests.

Although normally each of the client devices 102a-c would execute different frontend software that provides a substantially fixed (e.g., hardcoded) frontend interface designed for its corresponding channel, in some examples the frontend interfaces 136a-c can execute the same or similar frontend software, which may be device agnostic or operating system agnostic. This frontend software can communicate with the backend system 112, which can dynamically generated the frontend interfaces 136a-c. To generate the frontend interfaces 136a-c, the backend system 112 can execute a frontend-interface customization engine 138 (FICE). The same FICE 138 can be used to dynamically generate all of the frontend interfaces 136a-c for all of the client devices 102a-c. The backend system 112 may provide these dynamically generated interfaces to the client devices 102a-c, for example as a web user interface. This may improve flexibility by allowing the frontend interfaces 136a-c to be dynamically customized to the different transaction channels, users, and/or device types. This may also offload some of the interface generation to the backend, which may reduce resource consumption on the client devices 102a-c.

The system 100 can determine which transaction channel corresponds to which client device. For example, the backend system 112 can automatically determine which transaction channel corresponds to the client device 102a based on the characteristics of the client device 102a. As one particular example, the client device 102a can indicate one or more of its characteristics to the backend system 112 (e.g., via API 132). Examples of the characteristics can include the client device's type, screen size, hardware, software, or any combination of these. The client device 102a may additionally or alternatively transmit a channel identifier to the backend system 112, where the channel identifier indicates what type of transaction channel is associated with the client device 102a. Based on the characteristics and/or the channel identifier, the backend 112 can determine which transaction channel corresponds to which client device 112a.

Based on the transaction channel corresponding to a client device 112a, the FICE 138 can determine one or more frontend-interface customizations for that client device. For instance, the FICE 138 can determine that a particular transaction channel is associated with the client device 102a based on its running software, its hardware, or its channel identifier. The FICE 138 can then determine one or more frontend-interface customizations corresponding to the particular transaction channel. Examples of the frontend-interface customizations can include adjustments to the sizes, types, and/or arrangements of modules (e.g., widgets) or other content output in the frontend interface 136a. The FICE 138 can then provide the frontend-interface customizations to the client device 102a. In response to receiving the frontend-interface customizations, the client device 102a can output a frontend interface 136a that includes the frontend-interface customizations. A similar process can be applied to the other client devices 102b-c to dynamically generate their frontend interfaces 136b-c, though their frontend-interface customizations may be different than those of client device 102a given their different characteristics and transaction channels. In this way, the FICE 138 can dynamically generate initial (e.g., baseline) frontend interfaces 136a-c that are adapted to the client devices 102a-c and their corresponding transaction channels.

In some examples, the FICE 138 can also be used to dynamically update aspects of a client device's frontend interface over time. For example, the client device 102b may output an initial frontend interface 136b that is substantially the same for all users. A user 104b may interact with the initial frontend interface 136b, or otherwise interact with the client device 102b, to input their unique identification code (e.g., account number). The client device 102b can then transmit a request 134 with the unique identification code to the backend system 112. At the backend system 112, the FICE 138 can receive the unique identification code. The FICE 138 can analyze historical data 120 in one or more databases 118 based on the unique identification code. The historical data 120 may include, for example, histories of objects (e.g., items or products) obtained by one or more individuals from the entity. Based on this analysis, the FICE 138 can identify a customized object previously obtained by the user 104b. The customized object can be an object that has attributes that were previously customized in a particular manner by the user 104b. The FICE 138 can then determine a frontend-interface customization based on the object. For example, the FICE 138 can determine that the customized object should be included in a menu of the frontend interface 136b, to simplify the order process for the user 104b. So, the FICE 138 can transmit the frontend-interface customization to the client device 102b, which can dynamically update its frontend interface 136b to include the frontend-interface customization. In this way, the frontend interface 136b may be tailored not only to the client device 102b and the transaction channel, but also the user 104b that is operating the client device 102b. After the user 104b finishes the transaction, the frontend interface 136b may automatically revert back to its baseline state for use by the next user (e.g., so that the custom object is removed from the menu).

As another example, the user 104c may operate a scanning device 106 to scan a physical identification (e.g., a card or key fob) of a guest that is physically present at the physical location 114. Examples of the scanning device 106 can include a laser scanner or a camera. The scanning device 106 may be integrated with the client device 102c or, alternatively, may be separate from and connected to the client device 102. The physical identification can have a machine-readable representation of a unique identification code associated with the guest. In other examples, the user 104c can input the unique identification code associated with the guest into the client device 102c. Either way, the client device 102c can receive the unique identification code and forward the unique identification code to the backend system 112, which can determine one or more frontend-interface customizations based on the unique identification code (e.g., in the manner described above). The FICE 138 can then transmit the frontend-interface customizations to the client device 102c, which can update its frontend interface 136c to include the frontend-interface customizations. In this way, the frontend interface 136c may be tailored not only to the client device 102c and the transaction channel, but also the guest that is being served by the user 104c. After the user 104c finishes the transaction, for example by using a card reader 108 to process a card transaction, the frontend interface 136c may automatically revert back to its baseline state for use in taking the next guest's order.

In some examples, the FICE 138 can dynamically determine one or more popular objects associated with the entity. A popular object is an object that is provided by the entity and that has reached at least a predefined level of popularity, as objectively measured using at least one predefined metric. For example, an object may be considered to have reached the predefined level of popularity if the object is has obtained a trending status on social media, if the object has been mentioned at least a threshold number of times by one or more news outlets, if the object has been mentioned at least a threshold number of times by a selected group of individuals, or if the object has received at least a threshold rating from reviewers. In some examples, an object may be considered a popular object with respect to one demographic or region (e.g., city, state, or country) but not another. For example, an object may be considered a popular object in the United States but not in China. As another example, an object may be considered popular by males under 30 years old, but not to others. Thus, popularity may be dependent on demographic or region. To determine the popular objects, the FICE 138 can interact with a web data analyzer 130. The web data analyzer 130 can automatically receive and analyze data from the Internet (e.g., social media websites, news websites, and other websites 128) to identify popular objects associated with the entity. In some examples, the web data analyzer 130 can analyze the data to identify objects that are considered popular to a demographic or region associated with a user, such as the user that is accessing the front-end interface. For instance, the web analyzer 130 can access a profile of a user 104b to determine the user's demographics, and then customize its determination of the popular objects based on those demographics. In this way, different popular objects may be determined for users associated with different demographics or regions. The web data analyzer 130 can then provide details about the popular objects to the FICE 138.

After identifying a popular object, the FICE 138 can determine if the popular object is already included in one or more frontend interfaces 136a-c. If not, the FICE 138 can automatically add the popular object to the frontend interfaces 136a-c. To do so, the FICE 138 can interact with the client devices 102a-c to update their frontend interfaces 136a-c (e.g., menus) to include the popular object. For example, the FICE 138 can transmit information about the popular object to the client devices 102*a-c*, which can update their respective frontend interfaces 136*a-c* based on the information to include the popular object. For example, the frontend interfaces 136*a-c* may have a preset menu, which can serve as a baseline that can be extended to include one or more additional objects that have reached at least a predefined level of popularity on social media (e.g., Facebook®, Twitter®, Reddit®, etc.). The frontend interfaces 136*a-c* may also be updated to add a graphical option that is selectable for adding the popular object to an order.

If, at a later time, the object's popularity wanes and falls below the predefined level of popularity required for inclusion in the frontend interfaces 136*a-c*, the FICE 138 may similarly interact with the client devices 102*a-c* to automatically remove the object from their frontend interfaces 136*a-c*. The corresponding graphical option may also be removed from the frontend interfaces 136*a-c*. In this way, some or all of the client devices 102*a-c*, across some or all of the transaction channels, can have their frontend interfaces 136*a-c* automatically and dynamically updated over time to add popular objects or remove unpopular objects.

In some examples, the backend system 112 may need variable information to process a transaction initiated by any of the users 104*a-c* via the client devices 102*a-c*. The variable information may be information that is not included in the transaction itself and subject to change. The backend system 112 can retrieve that variable information from internal databases 118 or a third-party system 122. The third-party system is a remote system operated by a third party, which is different from the users 104*a-c* and the entity associated with the backend system 112. After obtaining the variable information, the backend system 112 can apply the variable information as needed to process (e.g., finish) the transaction.

The decision of whether to retrieve the variable information from the internal databases 118 or the third-party system can depend on whether an event recently occurred. An event can be considered to have "recently" occurred if the event occurred within a predesignated time window, such as the last day. Examples of the event can include a regulatory change, a legal change, a change in a policy (e.g., a company or security policy), or another rule change. The backend system 112 can detect whether the event recently occurred by executing an event detection engine 126. In some examples, the event detection engine 126 can receive and automatically process data from the Internet to determine whether the event occurred and when it occurred. For example, the event detection engine 126 may scrape data from news websites or other sources, and/or interact with the web data analyzer 130, to obtain the data. The event detection engine 126 can then automatically analyze the data to determine whether and when the event occurred. Additionally or alternatively, the event detection engine 126 can determine whether and when the event occurred by analyzing data stored in the internal databases 118, such as stored policy documents.

The event detection engine 126 can automatically analyze the abovementioned data in any suitable manner, such as by parsing through the data and/or applying a trained machine-learning model to the data. Examples of the machine-learning model may include a neural network, classifier, support vector machine, or an ensemble of multiple models. In some cases, the machine-learning model may be natural-language processing (NLP) model that can analyze news articles, blog posts, social media posts, and other data that is in a natural-language format. The machine-learning model can be iteratively trained using a set of training data (e.g., using supervised, semi-supervised, or unsupervised training techniques), for example until the model can detect the event with a sufficient degree of accuracy.

If the event occurred recently, then the data stored in the backend system's databases 118 may be outdated. In such cases, the backend system 112 can retrieve the variable information from the third-party system 122. For example, the backend system 112 can transmit a request for the variable information to the third-party system 122. The request may include one or more details of the transaction, such as an amount and physical location (e.g., a city, state, and/or country) associated with the transaction. The third-party system 122 can receive the request and, in response, use an information determination engine 124 to determine the variable information based on some or all of the transaction details included in the request. In some examples, the information determination engine 124 may be configured to compute the variable information using one or more algorithms, which may have variables that can be adjusted based on the recent event and one or more details included in the request. In some such examples, the variable information can be a numerical value. After determining the variable information, the third-party system 122 can transmit the variable information to the backend system 112 for use in facilitating the transaction.

If the event did not occur recently, then the data stored in the backend system's databases 118 may be current enough (i.e., not outdated) to use in the transaction. So, the backend system 112 can determine the variable information by analyzing the stored data in the databases 118, and forego transmitting a request to the third-party system 122. For example, the backend system 112 can determine the variable information by analyzing the historical data 120 about prior transactions associated with various users. In some such examples, the variable information may be a numeral value or other value associated with another transaction that involves the same or similar objects. By only communicating with the third-party system 122 when the event has recently occurred, the number of external network communications can be reduced. This, in turn, can reduce the consumption of processing power, memory, and bandwidth. After determining the variable information using either of the above techniques, the backend system 112 can then apply the variable information to the transaction.

In some examples, a user of a client device may want to add a new object to a menu associated with a physical location 114. The new object may be a customized version of an existing object on the menu for the physical location 114. Alternatively, the new object may be an object that is not already present on the menu for the physical location 114. For instance, a barista working at the physical location 114 may want to create a customized coffee as a special, which may only be available at the physical location 114. Through the frontend interface 136*c*, the user 104*c* can input all of the custom attributes for the new object and submit the new object, at which point details about the new object may be transmitted to the backend system 112 for inclusion in one or more backend processes. The new object may also be added to a local menu associated with the physical location 114, so that other users can order the new object as desired from the physical location 114. Client devices 102*a-c* that then attempt to obtain an object from that physical location 114 will be presented with the new object as a menu option in their frontend interfaces 136*a-c*.

In some examples, the frontend interfaces 136*a-c* may have accessibility features to help assist visually impaired users in operating the interfaces. More specifically, the frontend interfaces 136a-c may have an accessibility option that can be selected to activate an accessibility mode. In the accessibility mode, the system 100 can provide certain accessibility features, which may be driven by the client devices 102a-c and/or the backend system 112. For example, a screen reader may be provided in the accessibility mode. The screen reader can generate synthetic speech that explains or otherwise indicates visual characteristics of the frontend interfaces 136a-c, such as the content or visual options present in the frontend interfaces 136a-c. The synthetic speech can be output by the client devices 102a-c using an audio system that includes one or more speakers. As another example, the frontend interfaces 136a-c may be automatically adjusted in the accessibility mode to have different colors, text characteristics, and/or visual arrangements selected to improve visibility. For instance, when the accessibility mode is activated, the frontend interfaces 136a-c may be modified from their normal state to have high-contrast colors, larger font sizes, and enlarged or reorganized images.

In some examples, the system 100 may include voice assistance to allow a user 104a-c to more rapidly input an order. For example, the system 100 can include one or more machine-learning models (e.g., natural language processing (NLP) models) trained to detect voice commands input by a user. The machine-learning models can execute on the client device 102 or the backend system 112. In response to detecting a voice command from a user, the system 100 can perform a related action. As one specific example, the user 104c can speak a drink order into a microphone coupled to the client device 102c. The client device 102c can transmit the corresponding speech data to the backend system 112, where it can be processed by a machine-learning model to parse the speech data into one or more voice commands. The backend system 112 can then perform one or more actions based on the one or more voice commands. For instance, the backend system 112 may build the drink order including customizations, add the guest's name, and proceed with the checkout flow based on the voice commands. Thus, voice assist can be used to simplify much of the order taking process.

Figure 2:
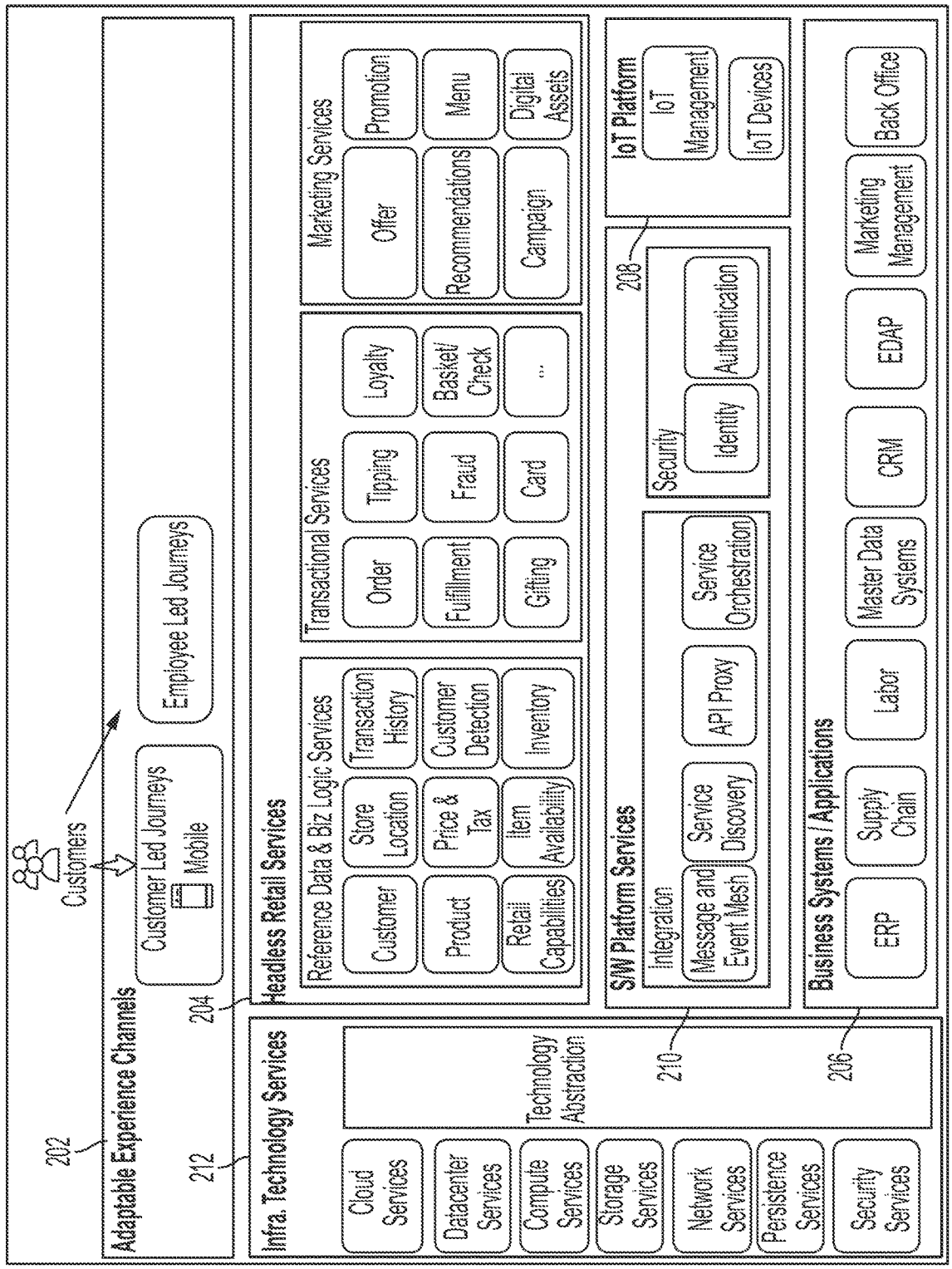
FIG. 2 shows a block diagram of an example of the backend system according to some aspects of the present disclosure.

More details about the backend system 112 will now be described with respect to FIG. 2. FIG. 2 shows a block diagram of an example of the backend system 112 according to some aspects of the present disclosure. As shown, the backend system 112 can support multiple different experience channels 202 (e.g., transaction channels) though which orders can be placed. To support these experience channels 202, the backend system 112 can include various infrastructure and technology services 212, including cloud services, datacenter services, compute services, storage services, network services, persistence services, and security services. The backend system 112 can also include software platform services 210, such as a message and event mesh, service discovery software, an API proxy, and orchestration tools. The backend system 112 can further include an Internet of Things (IOT) platform 208, which can include any number of IOT devices and management software for the IoT devices.

Applications 206 and other services 204 are also deployed in the backend system 112. The applications 206 may be configured to provide specific management tools. The other services 204 can facilitate the underlying functionality of the experience channels 202. For example, each of the services 204 can be a microservice or serverless function configured to perform a specific function. Some experience channels may have different functionality than others, which means that different sets or sequences of services 204 may be executed for some experience channels than for others. But, the same service may be used to perform the same function for some or all of the experience channels 202, which can reduce the consumption of computing resources as compared to deploying separate services for different experience channels 202.

The components 204-212 of the backend system 112 may be configured to leverage one or more internal databases (e.g., databases 118) or external databases to facilitate their functionality. Many of the components 204-212 may share the same databases to avoid duplication of content. Some or all of these components may also be configured to communicate with one another via application programming interfaces, which can simplify their communication protocols. The components 204-212 may be scaled and arranged as desired, for example to handle load changes and provide fault tolerance.

Figure 3:
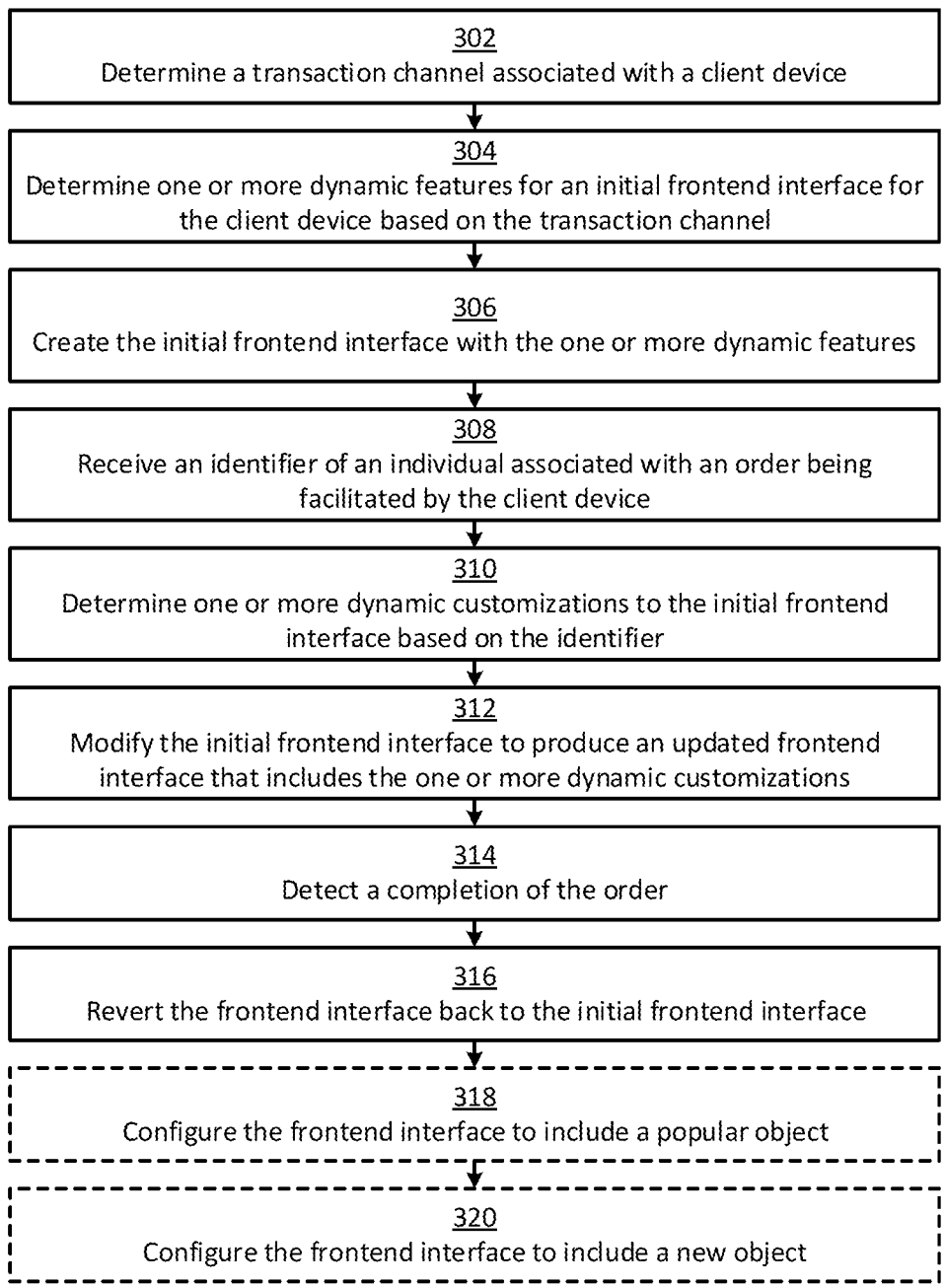
FIG. 3 shows a flowchart of an example of a process performed by a backend system for dynamically generating a frontend interface according to some aspects of the present disclosure.

FIG. 3 shows a flowchart of an example of a process performed by a backend system 112 for dynamically generating a frontend interface according to some aspects of the present disclosure. Other examples may include more operations, fewer operations, different operations, or a different order of operations than is shown in FIG. 3. The operations of FIG. 3 are described below with reference to the system 100 of FIG. 1 for simplicity, though it will be appreciated that this means any component or combination of components of the system 100 may implement any of the operations described below. For instance, the below operations may be implemented by the backend system 112, a client device (e.g., any of client devices 102a-c), or a combination thereof.

In block 302, the system 100 determines a transaction channel associated with a client device. For example, the backend system 112 can determine a transaction channel associated with a client device 102a based on one or more characteristics of the client device 102a, a channel identifier provided by the client device 102a, an endpoint to which the client device 102a connected, or any combination of these. For instance, the backend system 112 may have different endpoints (e.g., URLs or APIs) established for the different transaction channels. Client devices connecting to a given endpoint can be presumed to be using the corresponding transaction channel.

In block 304, the system 100 determines one or more dynamic features for an initial frontend interface for the client device based on the transaction channel. The initial frontend interface can be the baseline user interface that is output to some or all users of the client device, before additional user- or guest-specific customizations are made to the user interface. Different transaction channels can have initial frontend interfaces that are visually and/or functionally different from one another, because the different transaction channels may have functional differences from one another.

The dynamic features are features that can be dynamically included or excluded from an initial frontend interface, depending on the corresponding transaction channel. The system 100 can determine which dynamic features to include in the initial frontend interface, and how to spatially arrange then, based on configuration data. The configuration data can be stored on the backend system 112 and maintained by an administrator. In some examples, the dynamic features can be widgets that provide certain functionality. The widgets may be included, excluded, or spatially arranged in different ways depending on the corresponding transaction channel. The widgets may have various user interface components, such as buttons, menus, lists, sliders, or checkboxes. A user can interact with a widget to perform its corresponding functionality.

In block 306, the system 100 creates the initial frontend interface with the one or more dynamic features. For example, the backend system 112 can transmit code (e.g., HTML, JavaScript, CSS, etc.) for the one or more dynamic features to the client device, which can execute the code to create the initial frontend interface with the one or more dynamic features.

In block 308, the system 100 receives an identifier of an individual associated with an order that is being facilitated by the client device. For example, the client device may receive the identifier as user input. As another example, the client device may receive the identifier as a scanned input from a scanning device 106. The identifier may be a unique identification code associated with the individual.

In block 310, the system 100 generates one or more dynamic customizations to the initial frontend interface based on the identifier. For example, the backend system 112 can analyze historical data 120 associated with the individual to determine that the individual previously obtained a customized object in a prior transaction. Based on this determination, the backend system 112 can determine a dynamic customization that involves adding a graphical option specific to the customized object to the initial frontend interface, where the graphical option was not previously present in the initial frontend interface. The graphical option may show a name of the customized object, an image of the customized object, and/or other details about the customized object, such as the customizations applied to the object. The graphical option may be selectable to quickly (e.g., in a single click or step) add the customized object to a new order, so that all of the specific customizations applied to the object do not need to be manually reentered. This can greatly expedite the order process.

In block 312, the system 100 modifies the initial frontend interface to produce an updated frontend interface that includes the one or more dynamic customizations. For example, the backend system 112 can transmit code for the one or more dynamic customizations to the client device, which can execute the code to create the updated frontend interface with the one or more dynamic customizations.

In block 314, the system 100 detects a completion of the order. For example, the backend system 112 can determine that the ordering process has finished.

In block 316, the system 100 reverts the frontend interface back to the initial frontend interface that lacks the one or more dynamic customizations. For example, the backend system 112 can transmit a command to the client device, which can respond by updating the frontend interface to remove the one or more dynamic customizations and thereby revert the frontend interface back to its prior state. As another example, the backend system 112 can transmit code to the client device, which can execute the code to generate a new version of the frontend interface that lacks the one or more dynamic customizations.

Additional optional features are shown in blocks 318-320. These optional features may be performed at any point in the process, even though they are shown at the end of the process for simplicity.

In block 318, the system 100 configures the frontend interface to include a popular object. For example, the backend system 112 can determine the popular object using the web data analyzer 130. The backend system 112 can then transmit code or a message indicating the popular object to the client device. Based thereon, the client device can configure the frontend interface to include the popular object as a selectable option in a menu, such as a food or beverage menu. In this context, the popular object may be considered a dynamic feature that is dynamically added to the frontend interface (e.g., independently of the individual associated with the order).

In block 320, the system 100 configures the frontend interface to include a new object. The new object may be a customized version of an existing object on a preexisting menu, or the new object may be an object that is not already present in the menu. A user can input the details (e.g., attributes) of the new object and submit them via a client device. The details about the new object may be transmitted to the backend system 112, which may store information about the new object in the databases 118 and update certain backend processes accordingly to account for the new object. A description of the new object may also be added to a menu presented in a frontend interface, so that the new object can be ordered as desired from one or more physical locations. In some examples, the new object may have its availability limited to certain physical locations, which may be selected by the creator of the new object or other parties like a manager. In this context, the new object may be considered a dynamic feature that is dynamically added to the frontend interface (e.g., independently of the individual associated with the order).

Figure 4:
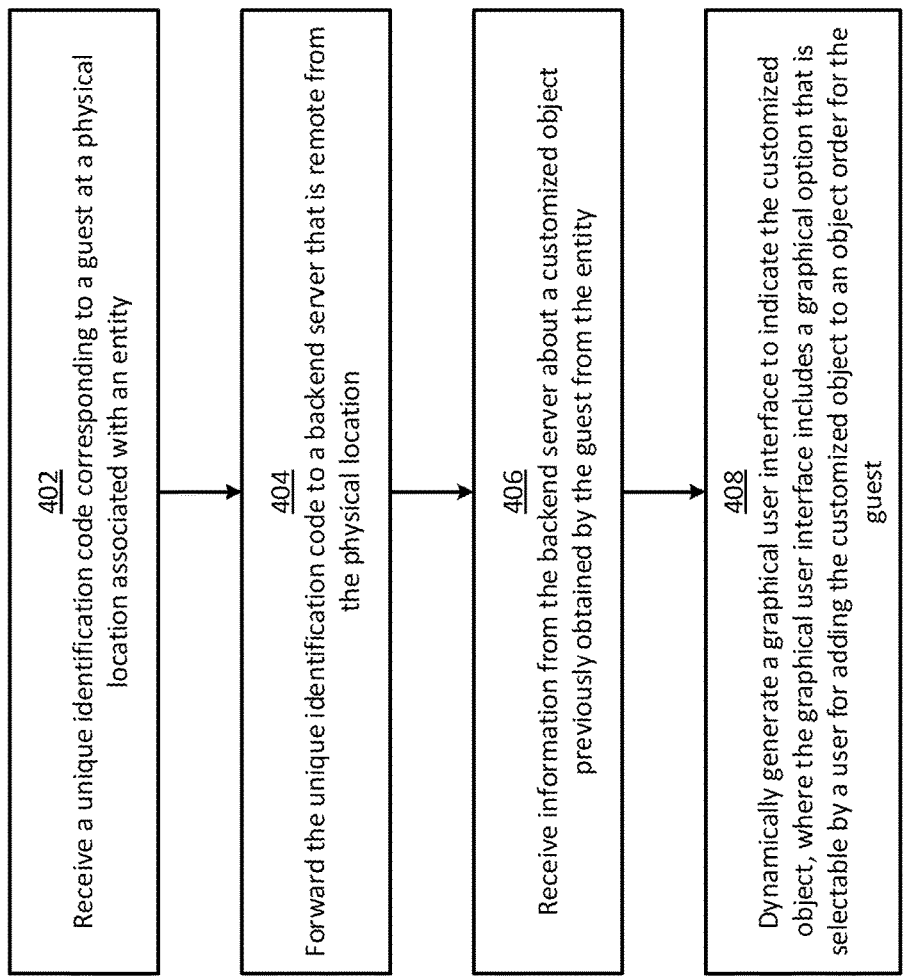
FIG. 4 shows a flowchart of an example of a process performed by a client device for dynamically generating a frontend interface according to some aspects of the present disclosure.

FIG. 4 shows a flowchart of an example of a process performed by a client device for dynamically generating a frontend interface according to some aspects of the present disclosure. Other examples may include more operations, fewer operations, different operations, or a different order of operations than is shown in FIG. 4. The steps of FIG. 4 are described below with reference to the components of FIG. 1.

In block 402, a client device receives a unique identification code corresponding to a guest at a physical location 114, which is associated with an entity. Examples of the client device can include any of the client devices 102*a-c* described above. The client device can receive the unique identification code as manual input or as a scanned input from a scanning device 106.

In block 404, the client device forwards the unique identification code to a backend system 112 that is remote from the physical location 114. The backend system 112 can include any number and combination of servers, so it may also be referred to herein as a backend server system. The backend system 112 can analyze a history (e.g., historical data 120) of the guest to determine a customized object previously obtained by the guest from the entity.

In block 406, the client device receives information from the backend system 112 about the customized object previously obtained by the guest from the entity. The information can indicate one or more custom attributes, previously selected by the guest during a prior transaction, to create the customized object.

In block 408, the client device dynamically configures (e.g., generates or updates) a graphical user interface to indicate the customized object. In some examples, the graphical user interface may also be dynamically configured based on other factors, such as the characteristics of the client device and/or a corresponding transaction channel. The graphical user interface may be a frontend interface for a corresponding transaction channel facilitated by the backend system 112. The graphical user interface can also be configured to include a graphical option that is selectable by a user of the client device for adding the customized object to an object order for the guest. The user of the client device may or may not be different from the guest. The user may then submit the order for processing to the backend system 112, which can perform the operations necessary to finish the transaction.

Figure 5:
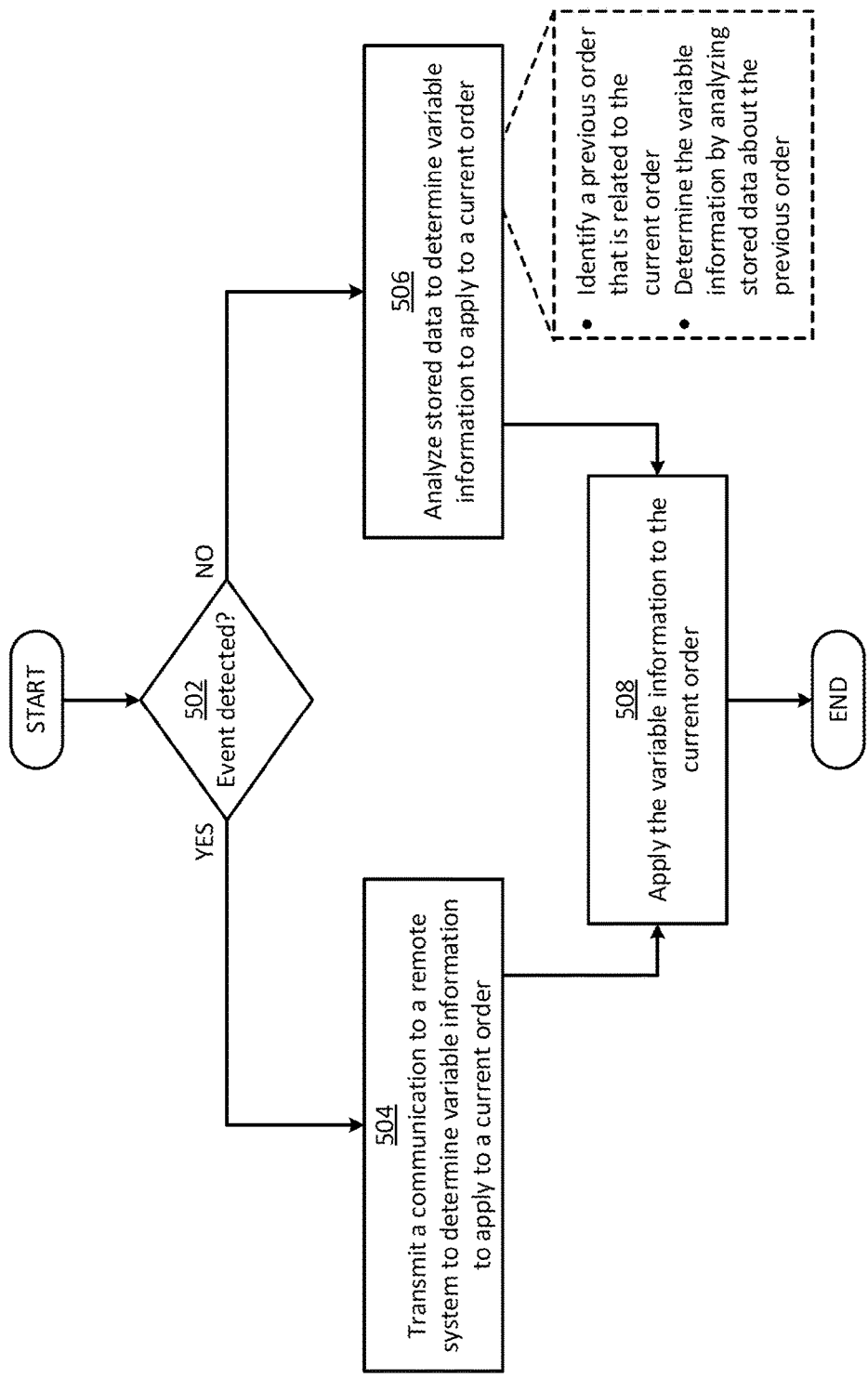
FIG. 5 shows a flowchart of an example of a process for determining whether to obtain variable information from locally stored data or a third party according to some aspects of the present disclosure.

As mentioned earlier, in some examples the backend system 112 may need variable information to perform a transaction. FIG. 5 shows a flowchart of an example of a process for determining whether to obtain variable information from internally stored data (e.g., data that is internal to the backend system 112) or a third party according to some aspects of the present disclosure. Other examples may include more operations, fewer operations, different operations, or a different order of operations than is shown in FIG. 5. The steps of FIG. 5 are described below with reference to the components of FIG. 1.

In block 502, the backend system 112 determines whether an event has been detected. To do so, the backend system 112 can execute the event detection engine 126, which can analyze data from one or more sources to determine whether the event has occurred. In some examples, the event may have a spatial component, a temporal component, or both. For instance, the event may be that a rule change occurred in a predefined geographical region within a predetermined time window. As one such example, the event may be that a change in tax policy occurred in a particular state within the last day. The predefined geographical region can correspond to a physical location associated with an order, such as the physical location in which the order was placed or the physical location in which the order will be fulfilled.

If the backend system 112 determines that the event occurred, then the process can proceed to block 504. At block 504, backend system 112 transmits a communication to a remote system (e.g., third-party system 122) to determine variable information to apply to a current order. An example of the variable information may be an additional charge amount, such as a tax amount to apply to the current order. The additional charge amount can depend on the total value of the objects in the current order. The remote system can determine the variable information, for example using the information determination engine 124, and then provide it to the backend system 112.

If the backend system 112 determines that the event did not occur, then the process can proceed to block 506. At block 506, the backend system 112 analyzes stored data (e.g., in databases 118) to determine the variable information to apply to the current order. For example, the backend system 112 can identify a previous order that is related to the current order by analyzing historical data 120. The previous order may be associated with the same person as the current order or a different person. The previous order can be considered to be related to the current order if the previous order took place within a particular time window of the current order. This time window may be the same time window that was evaluated in block 502 for an event. Additionally or alternatively, the previous order can be considered to be related to the current order if the previous order took place within the same geographical region as the current order. This geographical region may be the same geographical region that was evaluated in block 502 for an event. Additionally or alternatively, the previous order can be considered to be related to the current order if the previous order includes at least one object (e.g., a customized object) that is also part of the current order. Thus, in some examples, the backend system 112 can analyze the historical data 120 to identify a related order that includes the same or similar objects as the current order, and that occurred within the same time window and geographical region for which an event was not detected. Of course, in this branch of the flowchart, the backend system 112 can forego communicating with the remote system to determine the variable information.

In block 508, the backend system 112 applies the variable information to the current order. This may involve adding the variable information to the current order (e.g., adding an additional charge amount to the current order) or otherwise using the variable information to complete the current order.

Using the above techniques, the backend system 112 can intelligently determine when to communicate with the remote system based on the presence or absence of certain events. This can help to reduce the total number of such communications, which in turn can reduce the consumption of bandwidth and other computing resources.

Figure 6:
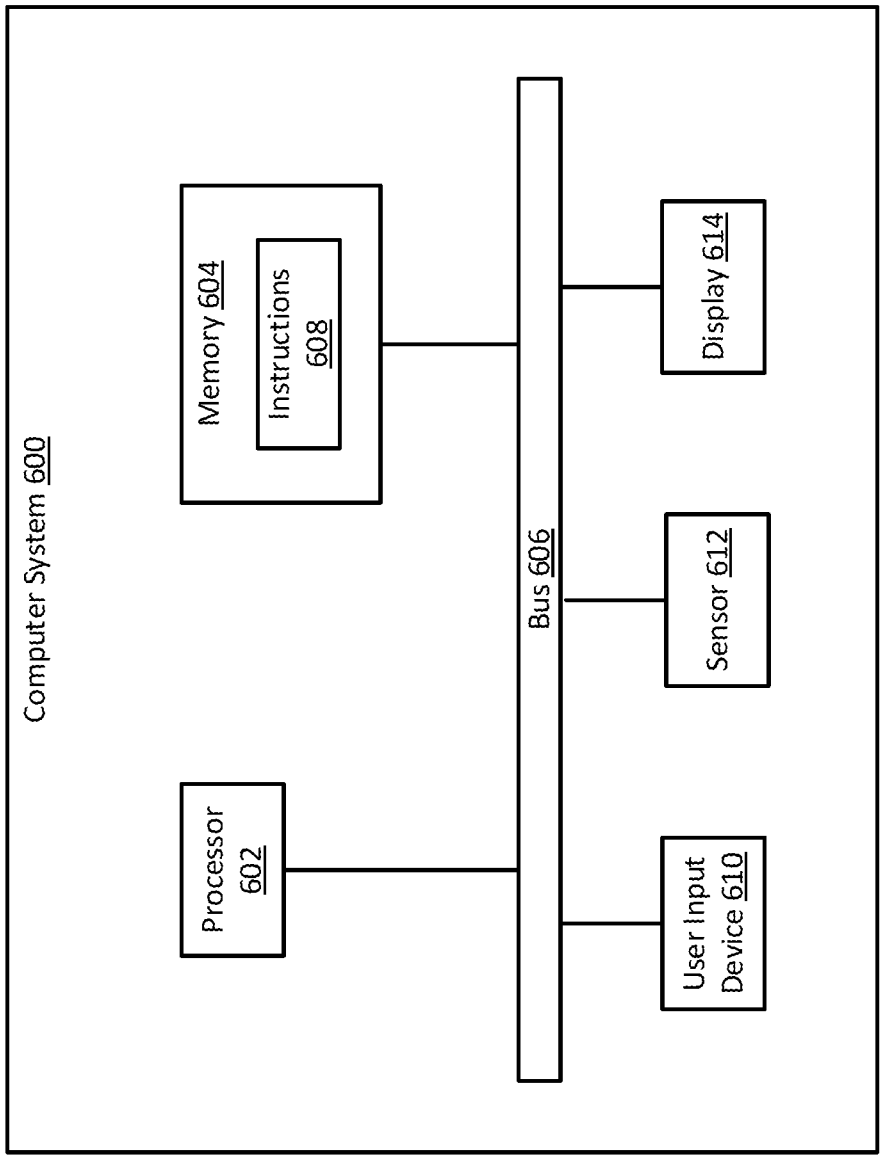
FIG. 6 shows a block diagram of an example of a computer system usable to implement some aspects of the present disclosure.

FIG. 6 shows a block diagram of an example of a computer system 600 usable to implement some aspects of the present disclosure. The computer system 600 can include any number of computing devices, such as multiple servers. In some examples, the computer system 600 can correspond to the backend system 112, one of the client devices 102a-c, or the third-party system 122 described above.

As shown, the computer system 600 includes a processor 602 communicatively coupled to a memory 604 by a bus 606. The processor 602 can include one processor or multiple processors. Examples of the processor 602 can include a Field-Programmable Gate Array (FPGA), an application-specific integrated circuit (ASIC), or a microprocessor. The processor 602 can execute instructions 608 stored in the memory 604 to perform operations. In some examples, the instructions 608 can correspond to the FICE 138, the backend services 116, the event detection engine 126, the web data analyzer 130, or any combination of these. The instructions 608 may include processor-specific instructions generated by a compiler or an interpreter from code written in any suitable computer-programming language, such as C, C++, C#, Java, or Python.

The memory 604 can include one memory device or multiple memory devices. The memory 604 can be volatile or non-volatile (can retain stored information when powered off). Examples of the memory 604 can include electrically erasable and programmable read-only memory (EEPROM), flash memory, or cache memory. At least some of the memory 604 includes a non-transitory computer-readable medium from which the processor 602 can read instructions 608. A computer-readable medium can include electronic, optical, magnetic, or other storage devices capable of providing the processor 602 with the instructions 608 or other program code. Examples of a computer-readable mediums include magnetic disks, memory chips, ROM, random-access memory (RAM), an ASIC, a configured processor, and optical storage.

The computer system 600 also includes one or more input components, such as user input device 610 and sensor 612. The user input device 610 can include one user input device or multiple user input devices. Examples of the user input device 610 can include a mouse, a keyboard, a touchpad, and a touch-screen display. The sensor 612 can also include one sensor or multiple sensors. Examples of the sensor 612 can include a camera, a laser scanner, a global positioning system (GPS) unit, an accelerometer, or any combination of these.

The computer system 600 further includes one or more output components, such as the display 614. The display 614 can include one display or multiple displays. Examples of the display 614 can include a liquid crystal display (LCD) or a light-emitting diode (LED) display. The computer system 600 may also include other output components. For example, the computer system 600 can include an audio system, such as a speaker. The computer system 600 may also include a haptic system, such as an eccentric rotating mass (ERM) vibrator or a piezoelectric vibrator.

The above description of certain examples, including illustrated examples, has been presented only for the purpose of illustration and description and is not intended to be exhaustive or to limit the disclosure to the precise forms disclosed. Various modifications, adaptations, and uses thereof will be apparent to those skilled in the art without departing from the scope of the disclosure. For instance, any examples described herein can be combined with any other examples to yield further examples.

The invention claimed is:

1. A method comprising:
providing, by a client device operated by a user, a channel identifier to a backend server system indicating a transaction channel associated with the client device, wherein the channel identifier uniquely identifies one of a plurality of transaction channels, wherein each transaction channel of the plurality of transaction channels is a different type of modality through which a plurality of client devices can submit object orders to the backend server system, and wherein the backend server system is configured to:
  determine, based on the channel identifier, that the transaction channel is associated with the client device; and
  based on determining that the transaction channel is associated with the client device, determine one or more graphical features to include in a first graphical user interface based on the transaction channel;
outputting, by the client device, the first graphical user interface with the one or more graphical features determined by the backend server system;
subsequent to outputting the first graphical user interface, receiving, by the client device, a unique identification code corresponding to a customer of an entity, the unique identification code being different from the channel identifier;
forwarding, by the client device, the unique identification code to the backend server system, the backend server system being configured to analyze a history of the customer to determine a customized object previously obtained by the customer from the entity;
receiving, by the client device, information from the backend server system about the customized object previously obtained by the customer from the entity;
displaying, by the client device, a second graphical user interface indicating the customized object associated with the customer in addition to the one or more graphical features determined by the backend server system;
receiving, by the client device, a selection by the user of a graphical option associated with the customized object;
in response to receiving the selection from the user, adding, by the client device, the customized object to an object order for the customer; and
in response to detecting a transaction completion for the customer, reverting to displaying, by the client device, the first graphical user interface;
wherein the backend server system is further configured to:
  in response to determining that a rule change did not occur within a first time window:
    identify a previous order that also includes the customized object;
    based on identifying the previous order, determine variable information associated with the previous order by receiving the variable information from a database that is separate from a remote system, wherein the variable information is different than the customized object; and
    based on receiving the variable information from the database, forego communicating with the remote system to determine the variable information; and
  in response to determining that the rule change occurred within a second time window that is different from the first time window, determine the variable information related to the customized object by communicating with the remote system; and
  apply the variable information to the object order.

2. The method of claim 1, further comprising:
receiving, by the client device and from the backend server system, additional information about a popular object, wherein the popular object is an object that has achieved at least a predefined level of popularity among a subpopulation of individuals according to a measured metric; and
configuring, by the client device, the first graphical user interface to indicate the popular object, wherein the first graphical user interface includes a selectable option for adding the popular object to the object order.

3. The method of claim 1, further comprising:
scanning, by a scanning device coupled to the client device, a machine-readable representation of the unique identification code associated with the customer; and
receiving, by the client device, the unique identification code from the scanning device.

4. The method of claim 1, further comprising:
receiving user input for creating a new object obtainable at a physical location of the entity;
in response to receiving the user input, adding the new object to a menu for the physical location; and
configuring the first graphical user interface to include the menu with the new object for the physical location.

5. The method of claim 1, wherein the backend server system is configured to:
determine which transaction channel, from among the plurality of transaction channels, is associated with the client device based on the channel identifier;
determine the one or more graphical features of the first graphical user interface based on the transaction channel associated with the client device; and
configure the first graphical user interface to include the one or more graphical features.

6. The method of claim 1, wherein the backend server system is configured to provide interfaces and functionality for the plurality of transaction channels, the backend server system including a plurality of services in a cloud computing environment, the plurality of services being configured to coordinate with one another to implement the functionality, and wherein the backend server system is configured to provide different frontend interfaces to different client devices based on which transaction channel of the plurality of transaction channels is associated with each client device of the different client devices.

7. The method of claim 1, wherein the backend server system is configured to:
determine whether the rule change occurred within the first time window.

8. The method of claim 1, wherein the backend server system is configured to:
determine whether the rule change occurred within the second time window.

9. The method of claim 1, wherein the client device is a point-of-sale terminal, and the user is different than the customer.

10. The method of claim 1, wherein the rule change is a change in a law or regulation.

11. The method of claim 1, wherein the user is the customer.

12. The method of claim 1, wherein the plurality of transaction channels includes a first transaction channel for mobile ordering, a second transaction channel for an in-store kiosk, and a third transaction channel for a point-of-sale terminal for an employee of the entity.

13. A non-transitory computer-readable medium comprising program code that is executable by one or more processors of a client device of a user for causing the client device to perform operations, the operations including:
providing a channel identifier to a backend server system indicating a transaction channel associated with the client device, wherein the channel identifier uniquely identifies one of a plurality of transaction channels, wherein each transaction channel of the plurality of transaction channels is a different type of modality through which a plurality of client devices can submit object orders to the backend server system, and wherein the backend server system is configured to:
determine, based on the channel identifier, that the transaction channel is associated with the client device; and
based on determining that the transaction channel is associated with the client device, determine one or more graphical features to include in a first graphical user interface based on the transaction channel;
outputting the first graphical user interface with the one or more graphical features determined by the backend server system;
subsequent to outputting the first graphical user interface, receiving a unique identification code corresponding to a customer of an entity, the unique identification code being different than the channel identifier;
forwarding the unique identification code to the backend server system, the backend server system being configured to analyze a history of the customer to determine a customized object previously obtained by the customer from the entity;
receiving information from the backend server system about the customized object previously obtained by the customer from the entity;
displaying a second graphical user interface indicating the customized object associated with the customer in addition to the one or more graphical features determined by the backend server system;
receiving a selection by the user of a graphical option associated with the customized object;
in response to receiving the selection from the user, adding the customized object to an object order for the customer; and
in response to detecting a transaction completion for the customer, reverting to displaying the first graphical user interface;
wherein the backend server system is further configured to:
in response to determining that a rule change did not occur within a first time window:
identify a previous order that also includes the customized object;
based on identifying the previous order, determine variable information associated with the previous order by receiving the variable information from a database that is separate from a remote system, wherein the variable information is different than the customized object; and
based on receiving the variable information from the database, forego communicating with the remote system to determine the variable information; and
in response to determining that the rule change occurred within a second time window that is different from the first time window, determine the variable information related to the customized object by communicating with the remote system; and
apply the variable information to the object order.

14. The non-transitory computer-readable medium of claim 13, wherein the operations further include:
receiving, from the backend server system, additional information about a popular object, wherein the popular object is an object that has achieved at least a predefined level of popularity among a subpopulation of individuals according to a measured metric; and
configuring the first graphical user interface to indicate the popular object, wherein the first graphical user interface includes a selectable option for adding the popular object to the object order.

15. The non-transitory computer-readable medium of claim 13, wherein the operations further include:
receiving user input for creating a new object obtainable at a physical location of the entity;
in response to receiving the user input, adding the new object to a menu for the physical location; and
configuring the first graphical user interface to include the menu with the new object for the physical location.

16. The non-transitory computer-readable medium of claim 13, wherein the backend server system is configured to provide different frontend interfaces to different client devices based on which transaction channel of the plurality of transaction channels is associated with each client device of the different client devices.

17. The non-transitory computer-readable medium of claim 13, wherein the backend server system is configured to:
determine whether the rule change occurred within the first time window; and
determine whether the rule change occurred within the second time window.

18. A client device comprising:
one or more processors; and
one or more memories including instructions that are executable by the one or more processors for causing the one or more processors to perform operations, the operations including:
providing a channel identifier to a backend server system indicating a transaction channel associated with the client device, wherein the channel identifier uniquely identifies one of a plurality of transaction channels, wherein each transaction channel of the plurality of transaction channels is a different type of modality through which a plurality of client devices can submit object orders to the backend server system, and wherein the backend server system is configured to:

determine, based on the channel identifier, that the transaction channel is associated with the client device; and based on determining that the transaction channel is associated with the client device, determine one or more graphical features to include in a first graphical user interface based on the transaction channel;

outputting the first graphical user interface with the one or more graphical features determined by the backend server system;

subsequent to outputting the first graphical user interface, receiving a unique identification code corresponding to a customer at a physical location associated with an entity, the customer being different than a user of the client device, and the unique identification code being different from the channel identifier;

providing the unique identification code to the backend server system that is remote from the physical location, the backend server system being configured to analyze a history of the customer to determine a customized object previously obtained by the customer from the entity;

receiving information about the customized object previously obtained by the customer from the entity;

displaying the a second graphical user interface indicating the customized object associated with the customer in addition to the one or more graphical features determined by the backend server system;

receiving a selection by the user of a graphical option associated with the customized object;

in response to receiving the selection from the user, adding the customized object to an object order for the customer; and in response to detecting a transaction completion for the customer, reverting to displaying the first graphical user interface;

wherein the backend server system is further configured to:

in response to determining that a rule change did not occur within a first time window:

identify a previous order that also includes the customized object;

based on identifying the previous order, determine variable information associated with the previous order by receiving the variable information from a database that is separate from a remote system, wherein the variable information is different than the customized object; and based on receiving the variable information from the database, forego communicating with the remote system to determine the variable information; and in response to determining that the rule change occurred within a second time window that is different from the first time window, determine the variable information related to the customized object by communicating with the remote system; and apply the variable information to the object order.

19. The client device of claim 18, wherein the operations further include:

identifying a popular object, wherein the popular object is an object that has achieved at least a predefined level of popularity among a subpopulation of individuals according to a measured metric; and configuring the first graphical user interface to indicate the popular object, wherein the first graphical user interface includes a selectable option for adding the popular object to the object order.

20. The client device of claim 18, wherein the operations further include:

determining whether the rule change occurred during the first time window.

21. The client device of claim 20, wherein the operations further include:

determining whether the rule change occurred during the second time window.

\* \* \* \* \*

UNITED STATES PATENT AND TRADEMARK OFFICE
CERTIFICATE OF CORRECTION

| | |
|---|---|
| PATENT NO. | : 12,001,653 B1 |
| APPLICATION NO. | : 18/201804 |
| DATED | : June 4, 2024 |
| INVENTOR(S) | : Jeremy S. Graham et al. |

It is certified that error appears in the above-identified patent and that said Letters Patent is hereby corrected as shown below:

In the Claims

In Column 21, Line 26, Claim 18: please delete "the a second" and insert --a second--

Signed and Sealed this
Sixteenth Day of July, 2024

Katherine Kelly Vidal
*Director of the United States Patent and Trademark Office*